United States Patent Office 3,534,034
Patented Oct. 13, 1970

1

3,534,034
PRODUCTION OF HEXAHYDROPYRIMIDINE ALDEHYDES
Harro Petersen, Frankenthal, Pfalz, Germany, assignor to Badische Anilin- & Soda-Fabrik Aktiengesellschaft, Ludwigshafen (Rhine), Germany
No Drawing. Filed Sept. 25, 1967, Ser. No. 670,437
Claims priority, application Germany, Sept. 30, 1966, 1,670,153
Int. Cl. C07d 51/18
U.S. Cl. 260—251                          11 Claims

ABSTRACT OF THE DISCLOSURE

Compounds of the formula

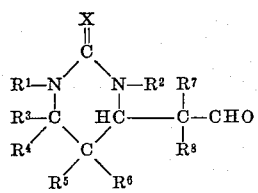

wherein X is oxygen or sulfur, $R^3$ through $R^8$ are hydrogen or alkyl radicals, $R^1$ and $R^2$ are neopentanal radicals or one of $R^1$ and $R^2$ can be alkyl are useful as textile treating agents. The compounds are prepared by treating 4-hydroxy-2-pyrimidinone with formaldehyde and an aldehyde, e.g., isobutyraldehyde, in the presence of a strong acid.

The invention relates to the production of hexahydropyrimidine dialdehydes and trialdehydes by the reaction of 4-hydroxyhexahydropyrimidines or 4-alkoxyhexahydropyrimidines with formaldehyde and an aldehyde or with an aldehyde alone, and to new substances of this type.

It is the object of this invention to provide a new process for the production of hexahydropyrimidine dialdehydes and trialdehydes bearing, as substituents, aldehydoalkyl groups in the 4-position and in the 1- and/or 3-position, an oxygen atom or sulfur atom in the 2-position and other substituents in the 5-position and if desired in the 6-position, in good yields and by a simple method.

Another object of the invention is to provide new hexahydropyrimidine dialdehydes and trialdehydes which bear, as substituents, aldehydoalkyl groups in the 4-position and in the 1- and/or 3-position, an oxygen atom or sulfur atom in the 2-position and other substituents in the 5-position and if desired in the 6-position.

In accordance with this invention these and other objects are achieved and hexahydropyrimidine aldehydes having the general formula:

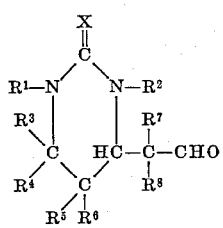

in which:

$R^3$ denotes a hydrogen atom or an alkyl radical,
$R^4$ denotes a hydrogen atom or an alkyl radical,
$R^5$ denotes an alkyl radical,
$R^6$ denotes an alkyl radical,
$R^7$ denotes an alkyl radical,

2

$R^8$ denotes an alkyl radical,
$R^1$ and $R^2$ denote the radical:

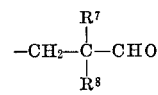

in which $R^7$ and $R^8$ have the above meanings, or one of the radicals $R^1$ and $R^2$ denotes an alkyl radical, and X denotes an oxygen atom or a sulfur atom, are obtained in a very simple way and in good yields (a) by reacting a hexahydropyrimidine having the general formula:

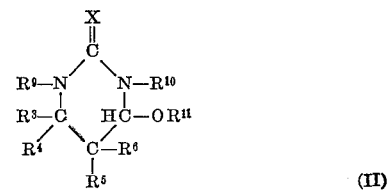

in which the radicals $R^3$, $R^4$, $R^5$ and $R^6$ and X have the above meanings, $R^9$ and $R^{10}$ both denote hydrogen atoms or one denotes a hydrogen atom and the other an alkyl radical, $R^{11}$ denotes a hydrogen atom or an alkyl radical, with formaldehyde and an aldehyde having the general formula.

in which the radicals $R^7$ and $R^8$ have the above meanings, in the presence of an acid and in the presence or absence of a solvent and/or diluent at temperatures of from 0° to 120° C., preferably from 40° to 100° C., using a molar ratio of starting material to formaldehyde to aldehyde having the Formula III of about 1:2:3 when reacting starting materials having the Formula II in which the redicals $R^9$ and $R^{10}$ both denote hydrogen atoms, and using a molar ratio of starting material to formaldehyde to aldehyde having the Formula III of about 1:1:2 when reacting starting materials having the Formula II in which one of the radicals $R^9$ and $R^{10}$ denotes an alkyl radical and the other denotes a hydrogen atom, or (b) by reacting a hexahydropyrimidine derivative having the general formula:

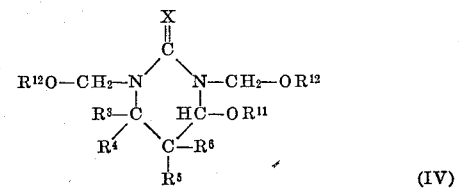

in which the radicals $R^3$, $R^4$, $R^5$, $R^6$ and $R^{11}$ and X have the meanings given above and $R^{12}$ denotes a hydrogen atom or an alkyl radical, with an aldehyde having the general formula:

in which the radicals $R^7$ and $R^8$ have the above meanings, in a molar ratio of 1:3 in the presence of an acid and in the presence or absence of a solvent and/or diluent at a temperature of from 0° to 120° C., preferably of from 40° to 100° C., or (c) by reacting a hexahydropyrimidine having the general formula:

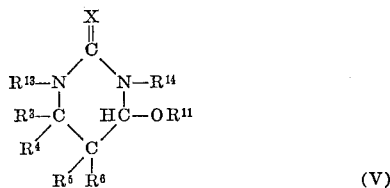

in which $R^3$, $R^4$, $R^5$, $R^6$, $R^{11}$ and X have the above meanings, one of the radicals $R^{13}$ or $R^{14}$ denotes a hydrogen atom and the other denotes the radical —$CH_2$—$OR^{12}$ in which $R^{12}$ has the above meaning, with formaldehyde and an aldehyde having the Formula III in a molar ratio of about 1:1:3 in the presence of an acid and in the presence or absence of a solvent and/or diluent at a temperature of from 0° to 120° C., preferably from 40° to 100° C.

The process may be represented for example for the reaction of 5,5-dimethyl-4-hydroxyhexahydropyrimidine with formaldehyde and isobutyraldehyde as follows:

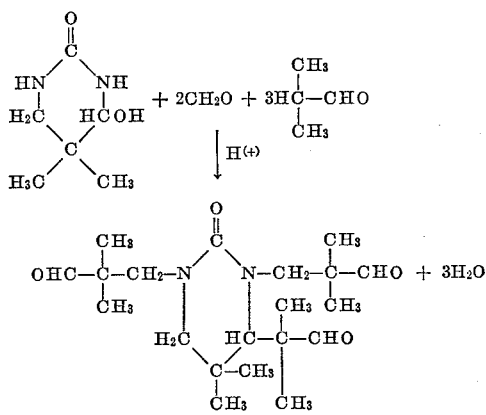

In the formulae of the compounds which are preferred as starting materials, the radicals $R^3$, $R^4$, $R^9$, $R^{10}$, $R^{11}$, $R^{12}$, and $R^{13}$ or $R^{14}$ denote hydrogen atoms or alkyl radicals having one to eight carbon atoms, and $R^5$, $R^6$, $R^7$ and $R^8$ denote alkyl radicals having one to seven carbon atoms. The following hexahydropyrimidine derivatives may for example be used as starting materials: 4-hydroxy-5,5-dimethyl-2-oxohexahydropyrimidine, 4 - hydroxy-5,5-dimethyl-6-isopropyl - 2 - oxohexahydropyrimidine, 4 - hydroxy-5-ethyl-5-butyl-6-isoheptyl - 2-oxohexahydropyrimidine and the corresponding 4-hydroxy-2-thiohexahydropyrimidines. Examples of other suitable starting materials are: 4 - methoxy-5,5-dimethyl-2-oxohexahydropyrimidine, 4-methoxy-5,5-dimethyl - 6 - isopropyl - 2 - oxohexahydropyrimidine, 4-ethoxy-5,5-dimethyl-6-isopropyl-2-oxohexahydropyrimidine and the corresponding 4-alkoxy-2-thiohexahydropyrimidines.

The formaldehyde may be used as an aqueous solution, as paraformaldehyde or in the form of trioxane or formaldehyde acetals.

Among the aldehydes having the Formula III, isobutyraldehyde, 2-methylpentanal and 2-ethylhexanal are particularly suitable.

The simultaneous reaction of a 4-hydroxyhexahydropyrimidine derivative or 4-alkoxyhexahydropyrimidine in which at least one of the radicals $R^1$ and $R^2$ denotes a hydrogen atom, with formaldehyde and an aldehyde having the Formula III in the presence of an acid is the most simple procedure and at the same time the most economical embodiment of the process according to this invention. It is also possible however to use the corresponding N-monomethyl, N-alkoxymethyl, N,N'-dimethylol or N,N'-dialkoxymethyl compounds of 4-hydroxyhexahydropyrimidine or 4-alkoxyhexahydropyrimidine derivatives for reaction with the CH-acid aldehydes.

The corresponding monomethylol or dimethylol compounds may first be prepared from the 4-hydroxy-2-oxo- hexahydropyrimidines, 4 - alkoxy-2-oxohexahydropyrimidines, 4-hydroxy-2-thiohexahydropyrimidines or 4-alkoxy-2-thiohexahydropyrimidines with formaldehyde and these reacted in a further reaction stage with an aldehyde having the Formula III in the presence of an acid. When an alkanol is present, the corresponding alkoxymethyl compounds are formed which may also be reacted.

Examples of suitable methylol compounds are: N,N'-dimethylol-4-hydroxy - 5,5 - dimethyl-2-oxohexahydropyrimidine, N,N'-dimethylol-4-hydroxy - 5,5 - dimethyl-6-isopropyl-2-oxohexahydropyrimidine, N - methyl-N'-methylol-4-hydroxy-5,5-dimethyl-2 - oxohexahydropyrimidine, N-monomethylol-4-hydroxy - 5,5-dimethyl-6-isopropyl-2-oxohexahydropyrimidine, N,N'-dimethylol-4-methoxy-5,5-dimethyl - 2 - oxohexahydropyrimidine, N,N' - dimethoxymethyl-4-methoxy-5,5-dimethyl - 2 - oxohexahydropyrimidine and the corresponding methylol and alkoxymethyl compounds of 4-hydroxy-2-thiohexahydropyrimidines and 4-alkoxy-2-thiohexahydropyrimidines.

The acids used should advantageously be acids which do not oxidize under the reaction conditions, for example hydrogen chloride, sulfuric acid, oxalic acid, toluenesulfonic acid, benzenesulfonic acid or ion exchangers containing sulfonic acids. The acids are advantageously used in amounts of 1 to 30% by weight with reference to the total amount of starting materials.

It is advantageous to carry out the reaction in the presence of solvents and/or diluents, such as water, tetrahydrofuran or dioxane. The solvents and/or diluents may be used singly or mixed together.

In general the reaction of the substances takes place in the stated molar ratios. Slight deviations from these molar ratios, for example of up to 10 mole percent, are however possible.

The process according to this invention involves a condensation reaction which can be accelerated by adding more acid, with or without raising the reaction temperature. In many cases it is possible to obtain the desired hexahydropyrimidine aldehydes at low temperatures in the presence of larger amounts of acid. On the other hand it is also possible to carry out the reaction at higher temperatures in the presence of less acid. The temperature chosen will depend on the reactants used and can be lowered by increasing the amount of acid added and vice versa.

The compounds obtainable by the process are textile finishing agents and valuable intermediates, for example for the production of textile and leather auxiliaries. Thus for example textile cloth may be impregnated therewith at the rate of 40 to 250 g. of said compounds per kg. of fibrous material from an aqueous suspension, dried at 70° to 140° C. and thus finished; a stiff, smooth, polished, full or hard handle of the textile cloth may be obtained depending on the constitution of the compounds concerned.

The invention is further illustrated by the following examples in which parts are by weight.

EXAMPLE 1

80 parts of 50% aqueous sulfuric acid is added to a mixture of 144 parts of 2-oxo-4-hydroxy-5,5-dimethyl-hexahydropyrimidine, 200 parts of 30% aqueous formaldehyde solution and 216 parts of isobutyraldehyde in a stirred apparatus having a reflux condenser and heated for five hours at refluxing temperature while stirring. The refluxing temperature rises from 60° C. to about 85° C. in the course of the first three hours. After the reaction is over, the whole is cooled to room temperature and neutralized with dilute caustic soda solution. The reaction product is exhaustively extracted from the reaction mixture with chloroform. The chloroform phase is dried with sodium sulfate and the chloroform is evaporated. 290 parts of a crude product is obtained which is subjected to fractional distillation in a high vacuum. The fraction which passes over at from 207° to 220° C. at 0.5 mm. Hg is collected separately. 208 parts of 2-oxo-5,5-dimethyl-hexahydropyrimidyl-1,3-dineopental-4-isobutyraldehyde is obtained.

*Analysis.*—Calculated for $C_{20}H_{34}O_4N_2$ (366), percent: C, 65.6; H, 9.3; N, 7.65. Found, percent: C, 65.4; H, 9.5; N, 7.4.

EXAMPLE 2

A mixture of 492 parts of 2-oxo-1,3-dimethoxymethyl-4-methoxy-5,5-dimethylhexahydropyrimidine, 432 parts of isobutyraldehyde and 100 parts of concentrated hydrochloric acid is heated for five hours at refluxing temperature in a stirred apparatus having a reflux condenser, the refluxing temperature rising from 70° C. to about 83° C. in the course of three hours. The reaction mixture is neutralized with dilute caustic soda solution and extracted with chloroform. The chloroform solution is dried with sodium sulfate and evaporated in a water-jet vacuum. 742 parts of crude product is obtained. It is purified by means of a high-vacuum fractional distillation. 376 parts of 2-oxo-5,5-dimethylhexahydropyrimidyl-1,3-dineopental-4-isobutyraldehyde is obtained at from 209° to 220° C. at a pressure of 0.5 mm. Hg. The product is identical with the reaction product obtained according to Example 1.

I claim:

1. A hexahydropyrimidine aldehyde having the general formula:

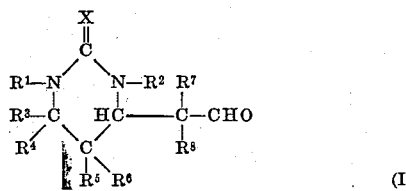

in which:
$R^3$ denotes a hydrogen atom or an alkyl radical having one to eight carbon atoms;
$R^4$ denotes a hydrogen atom or an alkyl radical having one to eight carbon atoms;
$R^5$ denotes an alkyl radical having one to seven carbon atoms;
$R^6$ denotes an alkyl radical having one to seven carbon atoms;
$R^7$ denotes an alkyl radical having one to seven carbon atoms;
$R^8$ denotes an alkyl radical having one to seven carbon atoms;
$R^1$ and $R^2$ denote the radical:

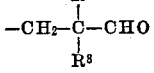

in which $R^7$ and $R^8$ have the above meanings, or one of the radicals $R^1$ and $R^2$ denotes an alkyl radical having one to eight carbon atoms and X denotes an oxygen atom or a sulfur atom.

2. 2-oxo-5,5-dimethylhexahydropyrimidyl-1,3-dineopental-4-isobutyraldehyde.

3. A process for the production of a hexahydropyrimidine aldehyde having the general formula:

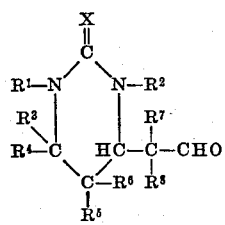

in which:
$R^3$ is hydrogen or alkyl of 1 to 8 carbon atoms,
$R^4$ is hydrogen or alkyl of 1 to 8 carbon atoms,
$R^5$ is alkyl of 1 to 7 carbon atoms,
$R^6$ is alkyl of 1 to 7 carbon atoms,
$R^7$ is alkyl of 1 to 7 carbon atoms,
$R^8$ is alkyl of 1 to 7 carbon atoms,
$R^1$ and $R^2$ each denotes the radical:

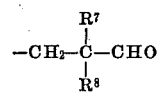

in which $R^7$ and $R^8$ have the above meanings or one of the radicals $R^1$ and $R^2$ denotes alkyl of 1 to 8 carbon atoms, and X is an oxygen atom or a sulfur atom, which process comprises: reacting a hexahydropyrimidine having the general formula:

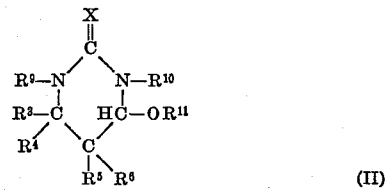

in which $R^3$, $R^4$, $R^5$, $R^6$ and X have the above meanings, $R^9$ and $R^{10}$ both denote hydrogen or one of them denotes hydrogen and the other alkyl of 1 to 8 carbon atoms, $R^{11}$ denotes hydrogen or alkyl of 1 to 8 carbon atoms, with formaldehyde and an aldehyde having the general formula:

in which the radicals $R^7$ and $R^8$ have the above meanings, in the presence of a strong acid which does not oxidize under reaction conditions, at a temperature of from 0° to 120° C., the amount of acid being from 1 to 30% by weight based on the total weight of the starting materials, using a molar ratio of starting material to formaldehyde to aldehyde having the Formula III of about 1:2:3 when reacting starting materials having the Formula II in which the radicals $R^9$ and $R^{10}$ both denote hydrogen atoms, and using a molar ratio of starting material to formaldehyde to aldehyde having the Formula III of about 1:1:2 when reacting starting materials having the Formula II in which one of the radicals $R^9$ and $R^{10}$ denotes an alkyl radical and the other denotes a hydrogen atom.

4. A process for the production of a hexahydropyrimidine aldehyde having the general formula:

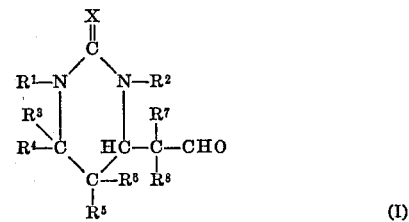

in which:
$R^3$ is hydrogen or alkyl of 1 to 8 carbon atoms,
$R^4$ is hydrogen or alkyl of 1 to 8 carbon atoms,
$R^5$ is alkyl of 1 to 7 carbon atoms,
$R^6$ is alkyl of 1 to 7 carbon atoms,
$R^7$ is alkyl of 1 to 7 carbon atoms,
$R^8$ is alkyl of 1 to 7 carbon atoms,
$R^1$ and $R^2$ each denotes the radical:

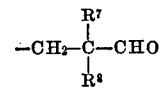

in which $R^7$ and $R^8$ have the above meanings or one of the radicals $R^1$ and $R^2$ denotes alkyl of 1 to 8 carbon atoms, and X is oxygen or sulfur, which process comprises:

$$R^{12}O-CH_2-N \diagdown \underset{\underset{\underset{R^5}{|}}{C-R^6}}{\overset{\overset{X}{\|}}{\overset{C}{\diagup}}} N-CH_2-OR^{12}$$
$$R^3-C \quad HC-OR^{11}$$
$$R^4 \quad C-R^6$$

(IV)

in which $R^3$, $R^4$, $R^5$, $R^6$, and X have the meanings given above and $R^{11}$ and $R^{12}$ denote hydrogen or alkyl of 1 to 8 carbon atoms, with an aldehyde having the general formula:

$$H-\underset{\underset{R^8}{|}}{\overset{\overset{R^7}{|}}{C}}-CHO$$

(III)

in which $R^7$ and $R^8$ have the above meanings, in a molar ratio of 1:3, in the presence of a strong acid which does not oxidize under reaction conditions and at a temperature of from 0° to 120° C., the amount of acid being from 1 to 30% by weight based on the total weight of the starting materials.

5. A process for the production of a hexahydropyrimidine aldehyde having the general formula:

$$R^1-N \diagdown \overset{\overset{X}{\|}}{\overset{C}{\diagup}} N-R^2$$
$$R^3 \quad R^7$$
$$R^4-C \quad HC-C-CHO$$
$$C-R^6 \quad R^8$$
$$R^5$$

(I)

in which:

$R^3$ is hydrogen or alkyl of 1 to 8 carbon atoms,
$R^4$ is hydrogen or alkyl of 1 to 8 carbon atoms,
$R^5$ is alkyl of 1 to 7 carbon atoms,
$R^6$ is alkyl of 1 to 7 carbon atoms,
$R^7$ is alkyl of 1 to 7 carbon atoms,
$R^8$ is alkyl of 1 to 7 carbon atoms,
$R^1$ and $R^2$ each denotes the radical:

$$-CH_2-\underset{\underset{R^8}{|}}{\overset{\overset{R^7}{|}}{C}}-CHO$$

in which $R^7$ and $R^8$ have the above meanings or one of the radicals $R^1$ and $R^2$ denotes alkyl of 1 to 8 carbon atoms, and X is an oxygen atom or a sulfur atom, which process comprises: reacting a hexahydropyrimidine having the general formula:

$$R^{13}-N \diagdown \overset{\overset{X}{\|}}{\overset{C}{\diagup}} N-R^{14}$$
$$R^3-C \quad HC-OR^{14}$$
$$R^4 \quad C$$
$$R^5$$

(V)

in which $R^3$, $R^4$, $R^5$, $R^6$ and X have the above meanings, $R^{11}$ denotes hydrogen or alkyl of 1 to 8 carbon atoms, one of the radicals $R^{13}$ and $R^{14}$ denotes hydrogen and the other denotes the radical $-CH_2-OR^{12}$ in which $R^{12}$ denotes hydrogen or alkyl of 1 to 8 carbon atoms with formaldehyde and an aldehyde having the formula $$H-\underset{\underset{R^8}{|}}{\overset{\overset{R^7}{|}}{C}}-CHO$$

(II)

in which $R^7$ and $R^8$ have the above meanings, in a molar ratio of about 1:1:3 in the presence of a strong acid which does not oxidize under reaction conditions and at a temperature of from 0° to 120° C., the amount of acid being from 1 to 30% by weight based on the total weight of the starting materials.

6. A process as in claim 3 wherein said process is carried out at a temperature of from 40° to 100° C.

7. A process as in claim 4 wherein said process is carried out at a temperature of from 40° to 100° C.

8. A process as in claim 5 wherein said process is carried out at a temperature of from 40° to 100° C.

9. A process as in claim 3 wherein said process is carried out in the presence of a solvent selected from the group consisting of water, tetrahydrofuran, and dioxane.

10. A process as in claim 4 wherein said process is carried out in the presence of a solvent selected from the group consisting of water, tetrahydrofuran, and dioxane.

11. A process as in claim 5 wherein said process is carried out in the presence of a solvent selected from the group consisting of water, tetrahydrofuran, and dioxane.

References Cited

UNITED STATES PATENTS 2,957,028   10/1960   Brannock _____ 260—601
3,335,187   8/1967   Hargis et al. _____ 260—601

FOREIGN PATENTS 655,066   1/1963   Canada.

OTHER REFERENCES

Blicke—Organic Reactions—vol. I—Wiley Press, 1942, pp. 306, 327, 332.

ALEX MAZEL, Primary Examiner

R. V. RUSH, Assistant Examiner

U.S. Cl. X.R.

252—8.8